Figures 1, 2:
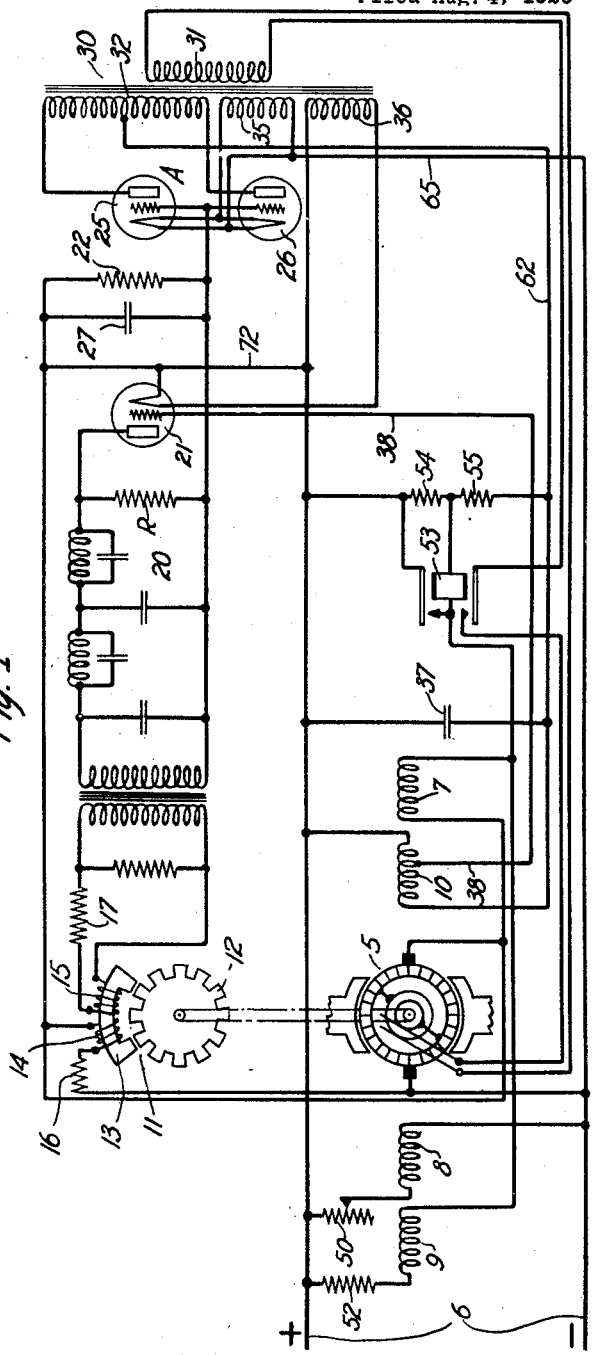

March 13, 1928.

E. C. MANDERFELD 1,662,071

REGULATING SYSTEM

Filed Aug. 4, 1926

Inventor:
Emanuel C. Manderfeld
by W. Griggs
Attorney

Patented Mar. 13, 1928.

1,662,071

UNITED STATES PATENT OFFICE.

EMANUEL C. MANDERFELD, OF BOONTON, NEW JERSEY, ASSIGNOR TO BELL TELEPHONE LABORATORIES, INCORPORATED, OF NEW YORK, N. Y., A CORPORATION OF NEW YORK.

REGULATING SYSTEM.

Application filed August 4, 1926. Serial No. 127,091.

This invention relates to regulating systems and aims to regulate, with sensitivity and precision, mechanical or electrical characteristics, as for example, speed frequency or voltage.

As a specific example of applications of the invention, there is described hereinafter the operation of an electric system embodying one form of the invention in maintaining the speed of an electric motor sensibly constant.

A copending application of H. M. Stoller and E. R. Morton, Serial No. 127,050, filed of even date herewith, entitled Regulating systems, discloses a system for regulating the speed of a direct current motor. In that system, the motor drives a high frequency generator, for supplying E. M. F. to the plate of an electric space discharge rectifier tube through a low-pass filter which has a cut-off at a frequency slightly below the frequency which the generator delivers at normal speed of the motor. In the rectifier plate circuit is a coupling resistance shunted by a by-pass condenser. The voltage across the resistance is applied to the grid circuit of a space discharge amplifier. The motor speed is regulated by passage of the amplifier plate current through a regulating field winding on the motor. The constants of the system are such that at normal motor speed the generator frequency is slightly above the cut-off frequency of the filter and corresponds to a point on the steep, negatively sloping portion of the voltage-frequency characteristic of the generator and the filter combined. Change in the motor speed and consequently in the generator frequency, causes the potential applied from the filter to the rectifier plate to vary in such manner that the resulting change in current in the regulating field winding of the motor checks the change in the motor speed.

The specific form of the instant invention shown in the drawing is a system having the features just described, but in which the space discharge rectifier has a grid or control element for controlling the space discharge, and in which the amplifier output is caused to render the rectifier grid potential negative by an amount varying with the amplifier output. This feed-back from the amplifier output to the rectifier grid gives a motor speed control effect cumulative with that which would exist in the absence of the feed-back and increases the sensitiveness and precision of the system in its regulating action.

In a specific aspect, a feature of the instant invention relates to a system for regulating a characteristic such as the characteristics mentioned above, in which the output current of each of two three electrode electric space discharge devices controls the grid potential of the other, and the output current of one controls means for effecting the desired regulation.

Other objects and features of the invention will be apparent from the following description and claims.

Fig. 1 is a circuit diagram of a system embodying one form of the invention and Fig. 2 is a curve for facilitating explanation of the invention.

In the following description of the specific form of the invention shown in the drawing, a specific set of values of speeds, frequencies, capacities, resistances, etc. is mentioned, by way of example only.

In the drawing is shown an electric motor 5 which is to have its speed held constant at, for example 1200 R. P. M. regardless of changes in operating conditions, such as changes in the voltage delivered by line 6 which supplies power for the operation of the motor, changes in the load (not shown) on the motor, changes in temperature, etc. The motor is shown as a direct current compound wound dynamo electric machine which has, in addition to its permanent series field winding 7 and its shunt field winding 8, an auxiliary series field winding 9 used in starting the motor and an auxiliary regulating field winding 10 under control of a vacuum tube regulator described hereinafter. All of these field windings are accumulative. An alternator 11 producing a high frequency, as for example 720 cycles at 1200 R. P. M., is driven from the motor. The alternator is shown as a small inductor type generator such as is disclosed in a copending application in the name of H. M. Stoller and E. R. Morton, Serial No. 124,599, filed July 24, 1926. The generator comprises a toothed rotor 12, and a stator 13 on which is an exciting winding 14 and an armature winding 15. A resistor 16 is included in series with the winding 14 for adjusting the value of the current in that winding. A resistor 17 is included in series with winding 15 to adjust the value of the normal current output from the winding.

The 720 cycle current from the generator passes through a low-pass filter 20 which transmits readily at any frequency up to 680 cycles per second and has a fairly sharp cut-off on higher frequencies. The output voltage from this filter is impressed upon the plate of a three-electrode electric space discharge rectifier or detector tube 21 which through a coupling resistance 22 having, by way of example, a value of 100,000 ohms varies the grid potential of an amplifier A comprising two three electrode space discharge tubes 25 and 26. A condenser 27 connected across resistance 22 suppresses voltage fluctuations across the resistance. This condenser may have a capacity of, for example, .01 mf. The current for the motor regulating field 10 passes through the space discharge paths of the amplifier A, so that the amplifier varies the current through the regulating field as described hereinafter. The power supply for the filament of tubes 21, 25, and 26 and for the plates of the amplifier tubes 25 and 26, is obtained from a transformer 30, and as explained hereinafter, the voltage of line 6 is also applied to the plate of the amplifier tubes 25 and 26. The primary winding 31 of this transformer is fed from a pair of slip rings connected to two electrically opposite commutator bars on the motor, which deliver 80 volts at 20 cycles per second to the slip rings. A secondary winding 32 of the transformer has its ends connected to the plates of tubes 25 and 26 respectively, and supplies current to those plates through a circuit traced hereinafter. A secondary winding 35 of the transformer is connected across the filaments of tubes 25 and 26 in parallel. A secondary winding 36 of the transformer 31 is connected across the filament of tube 21. The line 6 supplies direct current to the motor, at, for example 110 volts, and also serves as a source of positive "C" voltage for polarizing the grids of the amplifier tubes 25 and 26 from the positive line conductor through lead 72 and resistance 22, the filaments of these tubes being connected to the negative conductor of line 6 by conductor 65. A condenser 37 connected across the motor regulating field winding 10 suppresses voltage fluctuations across that winding, of frequencies of the order of the frequencies due to the rectifier action of amplifier A. This condenser may have a capacity of, for example, 0.1 mf. A conductor 38 connects the grid of the rectifier tube 21 to a point on the regulating winding 10 at a potential intermediate the potentials of the ends of the winding.

The curve in Fig. 2 is the voltage—frequency characteristic, or voltage—speed characteristic, of the generator 11 and filter 20 combined. The frequency varies with the motor speed. As the motor accelerates from stand still, the voltage at the output terminals of the filter rises, due to the rise in the increasing terminal voltage of the generator, until the frequency reaches the neighborhood of the frequency $c$, which is at about 680 cycles, the cut-off frequency of the filter. As the frequency increases above the cut-off frequency, the voltage at the output terminals of the filter decreases. For reasons made apparent hereinafter, the constants of the system are so adjusted that the normal operating point for the motor, or in other words, the point of the curve which corresponds to normal motor speed, is on the steep portion of the curve which lies just above the cut-off frequency and has negative slope, for example, the point $p$.

The motor is started by closing a switch (not shown) for connecting the line 6 to the generator (not shown) from which the line derives power. This puts full shunt field current on the motor from the upper or positive conductor of the line, through the fixed field resistance unit 50. Armature current for the motor flows from the positive line conductor through a starting resistance 52, for example, three ohms, through starting series field winding 9, permanent series field winding 7, through the armature and back to the negative conductor on line 6. The motor, therefore, starts as a compound wound motor having an abnormally strong field, with a fixed resistance in the armature circuit. When the speed of the motor has reached about 750 R. P. M. the voltage drop across the armature, due to the counter E. M. F., has risen to a value sufficient to cause operation of a starting relay 53. The winding of this relay is in a diagonal of a Wheatstone bridge circuit, two arms of the bridge consisting of resistance units 54 and 55 respectively, having their junction at one end of the diagonal, a third arm of the bridge consisting of the starting resistance 52 and field winding 9, and the fourth arm consisting of the field winding 7 and the armature. The upper contact of this relay connects the right-hand end of permanent series field winding 7 directly to the positive conductor of line 6, thereby short-circuiting the 3 ohm series resistance and the starting field winding 9 of the motor. This converts the motor into a compound wound motor directly connected to the line. The lower contact of the starting relay applies E. M. F., approaching a voltage of 80 volts and a frequency of 20 cycles per second as the motor approaches normal speed, from the slip rings on the motor to the primary winding 31 of the transformer 30, thereby causing a secondary winding 32 to impress plate voltage on the amplifier tubes 25 and 26, space current from which flows through the regulating field winding. This voltage is impressed on the plates in superposition on the line voltage, the circuit involved extending from the positive conductor of line 6 through regulating field winding 10 and condenser 37 in parallel, through the two halves of winding 32 and the space discharge paths of tubes 25 and 26, and conductor 65, to the negative conductor of line 6. At the same time the alternator is impressing high frequency on the filter 20, the output of which is connected to the plate of the rectifier tube 21. Since this is a low-pass filter and the motor has attained considerable speed but is not yet fully up to normal speed, the motor is still operating on the part of the curve of Fig. 2 which has a slope of positive sign and the detector tube current is large and produces an IR drop in the 100,000 ohm coupling resistance 22 which drives the grids of the amplifier tubes 25 and 26 negative, thereby suppressing current through the regulating field of the motor and giving the motor a weak field which tends to increase its speed.

The motor, therefore, will continue to accelerate until the speed reaches the value corresponding to the cut-off frequency of the low-pass filter, whereupon the plate voltage applied to the detector tube decreases, consequently decreasing the current through the coupling resistance 22 and decreasing the negative "C" voltage on the grids of the amplifier tubes 25 and 26. This causes a sudden increase in the space current of the amplifier, thereby strengthening the regulating field and preventing a further increase in speed. The motor has thus accelerated to its normal speed.

In earlier stages of the acceleration, that voltage at the output of the filter which is due to the generator is low, and positive potential applied from line 6 to the grids of tubes 25 and 26 through the resistance 22 tends to cause the regulating field to be strong; and where it is permissible to dispense with the auxiliary starting field this effect of the regulator may be used in causing the motor torque and counter E. M. F. and field strength to have the requisite value for the low speeds of the motor.

A manner in which the system may be operated to maintain constant motor speed under varying operating conditions, as for example varying line voltage or varying load on the motor will now be described. The normal speed of the motor corresponds to, say, the point $p$ on the curve of Fig. 2. When there occurs an increase in line voltage, there results a decrease in filter output voltage and in plate voltage of tube 21, and, therefore, a decrease in plate current of tube 21 and a consequent increase in plate current of tubes 25 and 26, thereby tending to prevent a rise in speed. Moreover, there is a further tendency to prevent a rise in speed, due to the fact that the increase in the plate current of tubes 25 and 26 increases the voltage drop in the regulating field winding, and, therefore, increases the negative voltage applied to the grid of tube 21 and consequently decreases the plate current of tube 21 still further. If, on the other hand, the line voltage decreases there results an increase in filter output voltage and plate voltage of tube 21, and therefore in plate current of tube 21, and consequent decrease in plate current of tubes 25 and 26, thereby tending to prevent a decrease in speed. Moreover, there is a further tendency to prevent a decrease in speed, due to the fact that the decrease in the plate current of tubes 25 and 26 decreases the voltage drop in the regulating field winding, and, therefore, decreases the negative voltage applied to the grid of tube 21 and consequently increases the plate current of tube 21. Should there occur an increase in load on the motor, tending to slow down the motor to a speed lower than normal, the system will operate in the manner just described in connection with compensation for line voltage decrease, to maintain normal speed. Should the load on the motor decrease, tending to cause the motor speed to exceed its normal value, the system will operate in the manner described above in connection with the compensation for increase of line voltage, to maintain normal motor speed.

The slope of that portion of the characteristic of the generator and filter over which the system operates to maintain constant speed should be sufficiently steep to obtain, with the aid of the feed-back effect in the regulator, the desired sensitiveness and precision of regulation. However, the filter cut-off need not be so sharp as if the feed-back effect were absent.

The amplifier tubes 25 and 26 serve as a full wave rectifier to rectify the waves induced in the secondary winding 32 for energizing the regulating field winding; and the super-position, upon the voltage waves induced in winding 32, of the direct voltage from line 6, increases the useful portion of those waves, by raising the mean positive value of the resultant voltage applied to the plates of tubes 25 and 26, or in other words by, in effect, shifting the zero axis of the waves downwardly.

The filaments of tubes 25 and 26 are connected to the negative conductor of line 6 by lead 65. The grids of these tubes are connected to the positive conductor of the line 6 through resistance 22 and lead 72. When the speed of the motor reaches a value corresponding to a frequency somewhat higher than the frequency at point *p* the plate of the rectifier tube 21 is no longer supplied with power at sufficient voltage to overcome the voltage drop in resistance 22 due to the current drawn by the grids of tubes 25 and 26 from the positive line conductor through lead 72. Since space current no longer flows through the detector 21, the current through the regulating field winding is large, the grids of the amplifier tubes 25 and 26 being positive with respect to their filaments. Therefore, there is a very strong tendency to slow the motor down.

What is claimed is:

1. In a regulator system, a dynamo-electric machine, a three-element electron discharge tube, means for controlling said discharge tube in accordance with an operating characteristic of the machine, an amplifier having an input circuit controlled by said discharge tube and an output circuit for governing said machine to maintain said operating characteristic substantially constant, and means for varying the operation of said discharge tube in accordance with conditions obtained in the output circuit of the amplifier.

2. In a regulator system, a dynamo-electric machine having a regulating field winding, means for controlling said field winding to maintain an operating characteristic of said machine substantially constant and comprising a three-element vacuum tube serving as a rectifier, and means for applying a potential from across a portion of said field winding to the grid of said tube, the potential applied to said grid element being varied inversely with the current rectified by the tube.

3. In a speed regulator system, a motor having a regulating field winding, means comprising a vacuum tube having anode, cathode and grid elements for controlling the energization of said regulating field in accordance with the motor speed to maintain the speed of the motor substantially constant, and means for applying a potential to the grid of said tube equivalent to the potential across a portion of said regulating field winding to effect a compensating action.

4. In a regulator system, a dynamo-electric machine having a field winding for regulating an operating characteristic thereof, means comprising a three-element vacuum tube for controlling the excitation of said field winding in accordance with the operating characteristic of the machine, and means for applying a potential varying inversely with the space current of the tube and from across a portion of said field winding to one element of said tube.

5. In a regulator system, a dynamo-electric machine having a field winding for regulating an operating characteristic thereof, a source of alternating current having the frequency thereof varied in accordance with any variation in said operating characteristic of the machine, means for varying the excitation of said field winding in accordance with the frequency of the current from said source, and comprising a three-element electron discharge tube connected to said source, and means for impressing the potential across a portion of said field winding on an element of said tube.

6. In a speed regulator system, a motor having a regulating field, a source of alternating current having the frequency thereof varied according to the speed of said motor, a three-element discharge tube connected to said source of current, an amplifier having an input circuit connected to said tube and controlled thereby, and an output circuit connected to said regulating field for maintaining the motor speed constant, and a feed-back circuit from said amplifier output circuit to said tube.

7. In a speed regulator system a motor having a regulating field, a source of alternating current having the frequency thereof varied according to the speed of the motor, an electron discharge tube having anode, cathode and grid elements, a low pass filter for connecting said tube to the source of alternating current, an amplifier having an input circuit connected to said tube and an output circuit connected to the regulating field for varying the energization of the field winding to maintain the motor speed constant, and a circuit connection from the output circuit of the amplifier to the grid of said electron discharge tube.

8. In a regulator system, a dynamo-electric machine having a field winding for regulating an operating characteristic thereof, means comprising a three-element space discharge tube for controlling the excitation of said field winding in accordance with the operating characteristic of the machine, and means for impressing a potential on the grid of said tube which varies inversely with the space current of the tube and directly with the current in said field winding.

9. In a regulator system, a dynamo-electric machine having a regulating field winding, means for controlling said field winding to maintain an operating characteristic of the machine substantially constant and comprising a three-element vacuum tube serving as a rectifier, and means for applying a potential to the grid of said tube which varies directly according to the current in said field winding and inversely according to the current rectified by the tube.

In witness whereof, I hereunto subscribe my name this 3 day of August A. D., 1926.

EMANUEL C. MANDERFELD.